United States Patent
Balla

[11] 3,864,186
[45] Feb. 4, 1975

[54] METHOD FOR INDUCTION SEALING PACKAGING MATERIAL

[75] Inventor: Gyula Balla, Malmo, Sweden

[73] Assignee: Tetra Pak International AB, Lund, Sweden

[22] Filed: Jan. 12, 1973

[21] Appl. No.: 323,095

Related U.S. Application Data

[63] Continuation of Ser. No. 95,150, Dec. 4, 1970, abandoned.

[30] Foreign Application Priority Data
Dec. 10, 1969 Sweden.............................. 17018/69

[52] U.S. Cl. ................................ 156/272, 156/290
[51] Int. Cl. ...................... B29c 19/02, B32b 31/00
[58] Field of Search ............................. 156/272, 290

[56] References Cited
UNITED STATES PATENTS

| | | | |
|---|---|---|---|
| 3,391,846 | 7/1968 | White ................................. | 156/272 |
| 3,424,885 | 1/1969 | Garney et al. ...................... | 156/272 |
| 3,461,014 | 8/1969 | James ................................. | 156/272 |
| 3,567,546 | 3/1971 | Morris et al. ...................... | 156/275 |

Primary Examiner—Douglas J. Drummond
Attorney, Agent, or Firm—Pierce, Scheffler & Parker

[57] ABSTRACT

A method of producing separate packages by sealing a continuous tube of a packaging material, the packaging material having a layer of metal foil and a layer of thermoplastic material on one side thereof in which opposed portions of the packaging material are juxtaposed with the layers of thermoplastic material facing each other. The two portions are pressed together along a transverse area by means including a coil supplied with a high frequency alternating current to produce a high frequency electromagnetic alternating field to induce heat producing eddy currents in the metal foil and said heat is transmitted to the thermoplastic material to fuse same and form two spaced tight, mechanically durable seals and cutting between the seals.

5 Claims, 2 Drawing Figures

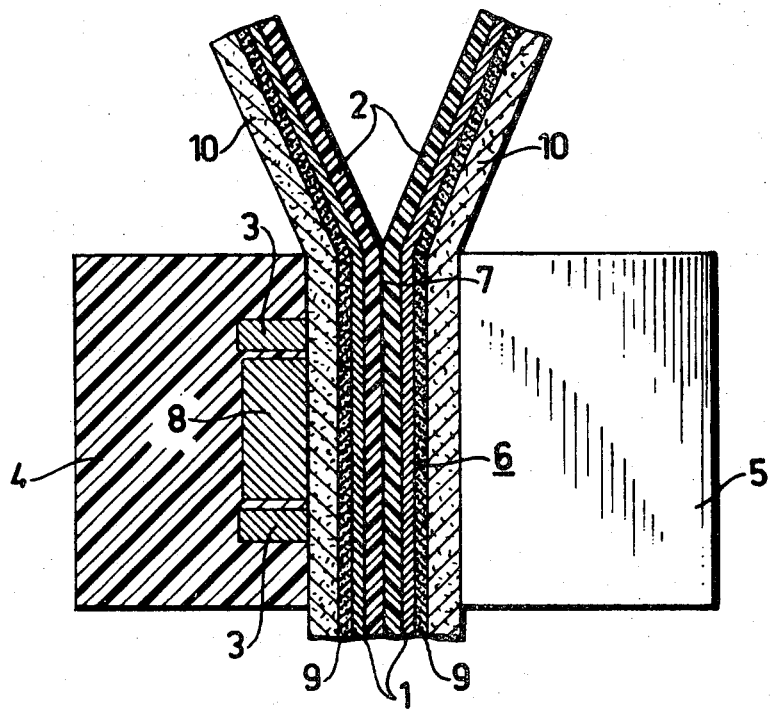
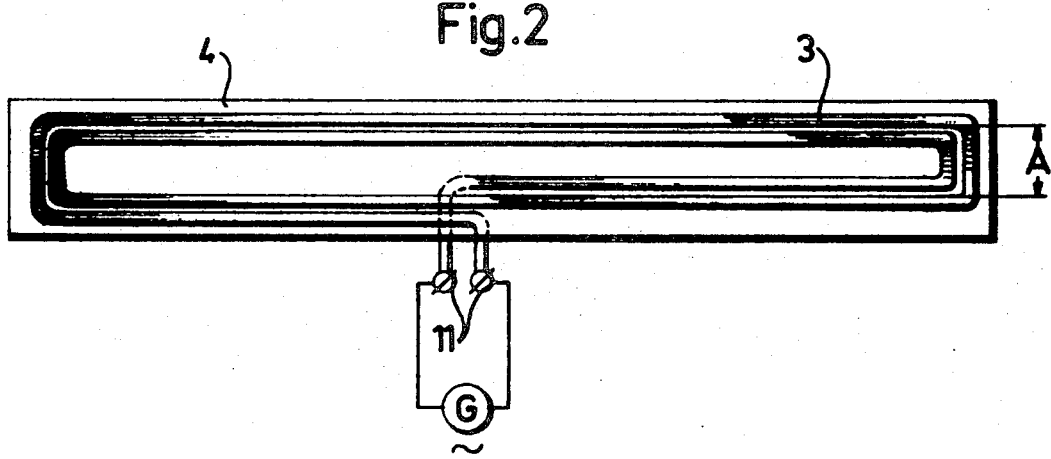

METHOD FOR INDUCTION SEALING PACKAGING MATERIAL

This is a continuation, of application Ser. No. 95,150 filed Dec. 4, 1970 now abandoned.

The present invention concerns a method for sealing packaging material comprising within its structure at least one layer of metal foil as well as one layer of a thermoplastic material, the said thermoplastic material being arranged in such a way as to constitute a sealing layer. The invention also concerns an arrangement for carrying out the method.

In packaging technology packaging material containing a layer of thermoplastic material, e.g., polyethylene or polypropylene is frequently thermoplastic The said thermoplastic material has not only proved itself to be impermeable to liquid and to have good resistance against fatty substances, acids, etc, but these materials also possess the important property that they can be sealed against one another by heating the plastic layer until it softens while the plastic layers in two facing layers of material are pressed against one another thus bringing about surface fusion between the thermoplastic layers. The said thermoplastic material is often laminated e.g., with paper in order to obtain a mechanically stiff packaging material, and in certain cases, when a packaging material which is gas-tight or has good taste-preserving properties is required, the laminate is often provided with a layer of metal foil, e.g., aluminum foil.

Plastic material such as polythene or polypropylene cannot be heated advantageously by high-frequency heating, so-called dielectric heating, since the dielectric losses for the said material are very small. In order to seal packages of the said type so-called contact heat has so far been used, i.e., the packaging materials are pressed against each other by means of pressure units and heated by means of heat-emitting devices provided in one or both pressure units. This method has among others the disadvantage that the sealing time is long since the heat must be fed from the outer layer of the packaging material to the inner thermoplastic sealing layer, and then generally through a heat-insulating layer of paper or carton. If the laminate contains a layer of metal foil the heat is, in addition, dissipated through this layer so that correspondingly larger amounts of heat have to be supplied by the heat-emitting device in order to compensate for the dissipation. In order to shorten the sealing time it is of course possible to increase the temperature of the heat-emitting device but the danger of damage through burning that part of the packaging laminate which is in direct contact with the heat-emitting device limits the temperature of these devices. In order to avoid the said difficulties when sealing packaging laminates containing on the one hand a sealing layer of plastic material and on the other hand a layer of metal foil, whereby the said layers are preferably laminated to one another, a method is proposed in accordance with the invention, characterised in that layers of the said sealing material which are placed against one another are so orientated that the said thermoplastic layers are turned towards each other, and are pressed together between press units whereupon at least parts of the compressed zone are subjected to the action of an alternating electro-magnetic field which is essentially orientated at right angles to the packaging material, thus causing heat-producing eddy currents to be induced in those parts of the metal foil layer in the packaging material which are subject to the action of the electro-magnetic field, which are thereby heated and, by conduction transmit heat to the thermoplastic sealing layers, thus causing fusion and the formation of a tight and mechanically-durable sealing joint.

The invention also concerns an arrangement for carrying out the method, this arrangement being characterised partly by a generator for the production of alternating current at a frequency between 0.5 and 2 MHz, partly by a working coil for conversion of the alternating current into an alternating electro-magnetic field, and partly by a pair of press units capable of co-operating, which are so designed that they are not to any great extent heated by the alternating field.

The invention is described in greater detail below with reference to the attached schematic drawing in which FIG. 1 shows a cross-section of two greatly enlarged layers of packaging material placed against one another, which are pressed together between two press units one of which contains a device for providing the necessary sealing heat, and FIG. 2 shows a sealing unit provided with a working coil.

Each of the packaging laminate layers 6 shown in FIG. 1 consists of a substratum layer 10 of e.g., paper or carton material, an inner sealing layer 2 of thermoplastic, e.g., polyethylene or polypropylene, a metal foil layer 1 of preferably aluminium foil and a laminating layer 9 intended to act as the bonding layer between substratum 10 and the metal foil layer 1.

In the present case it may be assumed that the packaging material 6 is produced in the shape of a web which is formed into a tube, the longitudinal edges of which are joined to one another by e.g., an overlap joint. The said tube, the inner layer of which consists of the thermoplastic material layer 2, can therefore be filled with the product to be packed by pouring it down progressively, whereupon the tube is divided into individual packaging units by transverse sealing along relatively narrow sealing zones 7 located at the required distances from one another along the axis of the tube. The said transverse sealing of the tube is advantageously carried out by means of the arrangement shown in the figure, which consists of two press units 4 and 5, respectively, which can be moved towards and from each other and are made of an electrically insulating material such as bakelite, steatite, cast plastic etc, one sealing unit 4 being provided with a working coil 3 which can be connected to a high-frequency generator not shown here, it being possible to arrange a core 8 of ferratic material within the working coil.

The sealing operation is carried out by pressing the press units 4 and 5, respectively, against one another, whereby they flatten the tube located between the press units in such a way that the thermoplastic sealing layers 2 are bent and pressed against one another. Once the press units 4 and 5, respectively, have attained their pressing position, a high-frequency alternating current between 0.5 and 2 MHz, preferably at about 1.5 MHz, is conducted from the high-frequency generator, which is not shown, through the working coil 3, a high-frequency electro-magnetic field which passes through the metal foil layer 1 being produced by the working coil 3, which is elongated to establish an essentially rectilinear configuration extending transversely across the flattened tube.

In order to increase the induction of the working coil 3 it is in some cases advisable to place an iron powder core, a so-called core 8 of ferratic material, within the coil 3. As a result of the high-frequency electromagnetic field passing through the metal foil layer 1 which is at a distance of 0.3 to 1 mm from the coil, so-called eddy currents are induced in the metal foil layer 1, these currents giving rise to the development of heat in those parts of the metal foil layer 1 which are subject to the alternating field. The heat produced in the metal foil layer 1 is conducted to the adjacent layers 2, which are heated to such a degree that they are fused into a homogeneous joint which, after disconnection of the alternating field, cools down and forms a mechanically durable seal 7. The sealing units 4 and 5 are removed after the sealing operation from the sealing material, to be re-applied about a further zone of the tube, whereupon the process is repeated.

Application of the method in accordance with the invention presupposes of course that the sealing material contains at least one layer of metal foil, preferably an aluminium foil, and that this aluminium foil 1 is laminated directly to the sealing layer 2, since the invention is based on the heat necessary for sealing being produced in the metal foil layer and on the said heat being thereafter passed on to the sealing layer.

The press units 4 shown in FIG. 2 are to illustrate the configuration of the rectilinear working coil 3 which in the given case consists of two turns of a copper rail embedded in epoxy resin. The terminals 11 of coils 3 are connected to a high-frequency generator G which supplies a high-frequency current at about 1.5 MHz, resulting in a magnetic alternating current the maximum field intensity of which is concentrated along the turnings of the coil. Owing to the fact that the alternating field is highly concentrated along the turnings of the coil if the sealing unit is designed in accordance with FIG. 2, two sealing borders at a distance from one another and corresponding to the distance A in the figure are obtained during the sealing operation. The sealed tube is conveniently separated by cutting through the said sealing zones whereby the completely sealed packaged units are separated. In order to achieve satisfactory sealing across the entire tube the coil 3 must of course be longer than the width of the flattened tube so that all parts of the tube come within the range of the coil.

The method in accordance with the invention described above can in shorter terms be described as a method of heating one layer in a laminate indirectly by generating heat in an adjacent layer in the same laminate. In this case it is a thermoplastic sealing layer which shall be heated to the sealing temperature and this heating of the sealing layer is performed in such a way that an adjacent layer of metal foil is heated by means of a high frequency electromagnetic field which causes eddy current losses in the metal foil layer. The eddy currents in the metal foil layer will rapidly heat the metal foil material while the adjacent plastic layers will be almost uneffected by the direct influence of the high frequency alectromagnetic field. Due to the fact that the heated metal foil layer is located adjacent to the plastic sealing layer said sealing layer will be heated by conduction from the metal layer and consequently indirectly heated to the sealing temperature.

It has been found that by the arrangement in accordance with the invention very short sealing times can be achieved, since heat need not be conducted through heat-insulating paper layers 10, and one also avoids damage through burning at the outside of the sealing material, inasmuch as the working coil 3 or the sealing unit are heated only to a very slight extent. The sealing arrangement can of course be used also for other packing materials than that which, in accordance with what has been described in this document, has first been converted into a tube, separated by means of transverse sealing zones; and it is of course also possible to provide a working coil 3 in each of the sealing units.

I claim:

1. A method of producing separate packages from a continuous tube having an inner layer of thermoplastic material and a layer of metal foil disposed on the outside thereof by forming simultaneously, two longitudinally spaced, adjacent, transverse seals across the tube comprising,
   pressing opposed portions of the tube together along a transverse area so that the layers of thermoplstic material of each portion are flattened together and are juxtaposed,
   inducing simultaneously a flow of two sets of spaced, adjacent, heat-producing eddy currents in the layers of the metal foil to heat said metal layers to a temperature sufficient to heat said thermoplastic material, by conduction, to fusion temperatures at two longidudinally spaced, parallel, adjacent, transverse zones in said transverse area to thereby form simultaneously two tight, mechanically durable, parallel, longitudinally spaced, adjacent, transverse seals, across the tube and,
   cutting the tube transversely between the two, adjacent seals to separate the continuous tube into separate packages.

2. A method as claimed in claim 1 wherein the layer of metal foil consists of aluminum foil.

3. a method as claimed in claim 1 wherein the thermoplastic material consists of polyethylene.

4. A method as claimed in claim 1 wherein the two sets of heat producing eddy currents are produced by a high frequency electromagnetic alternating field having a frequency of between about 0.5 and 2.0 MHz.

5. A method as claimed in claim 1 wherein the tube has a layer of carton material bonded to the outside of the metal foil layer.

* * * * *